A. C. Estabrook.
Hair Brush.
No. 3,676 Reissued Oct. 19, 1869.
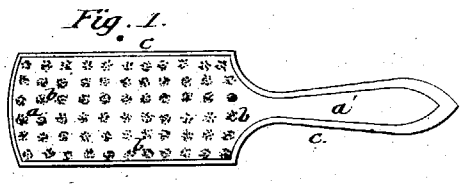
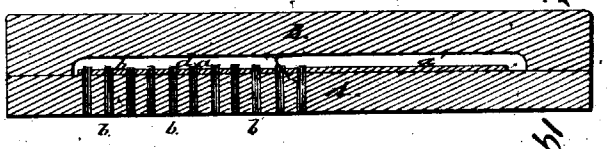
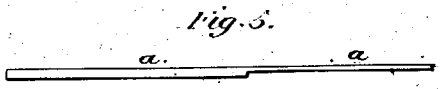
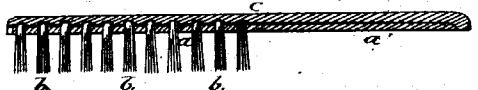
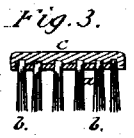
Witnesses;
Samuel N. Piper
G. H. Washburn
Inventor;
Marson C. Estabrook.
by his attorney
R. H. Eddy

UNITED STATES PATENT OFFICE.

FLORENCE MANUFACTURING COMPANY, OF FLORENCE, MASSACHUSETTS, ASSIGNEE, BY MESNE ASSIGNMENTS, OF ALANSON C. ESTABROOK.

IMPROVED BRUSH.

Specification forming part of Letters Patent No. 55,764, dated June 19, 1866; Reissue No. 3,676, dated October 19, 1869.

*To all whom it may concern:*

Be it known that ALANSON C. ESTABROOK, of Florence, in the county of Hampshire and State of Massachusetts, did invent certain new and useful Improvements in the Manufacture of Brushes; and we do hereby declare that the following specification, in connection with the accompanying drawings, affords a full, clear, and exact description of the same.

Of the drawings Figure 1 represents an under side view of the brush, brush-back, and strengthener. Fig. 2 represents a longitudinal section through the same. Fig. 3 represents a transverse section through a brush made after the herein-described invention. Fig. 4 represents a longitudinal section through certain molds, by which the handle and back of the brush may be shaped, formed, and molded over the strengthener. Fig. 5 represents a longitudinal section through a modified form of strengthener, and which becomes entirely incased in the handle portion of what is termed a "brush-back," as will be explained.

Similar letters of reference, where they occur in the separate figures, denote like parts in all of the drawings.

This invention consists, first, in a brush-back composed of a bed or base suitable for holding a brush, a handle, and an extension-piece or strengthener extending from one to the other, and a composition applied to both of such parts, and surrounding said strengthener or extension-piece; and it further consists in a brush-back in which its shape, form and ornamentation is given to it at the same time and by the same means that embeds the strengthener in the plastic composition that constitutes its exterior.

The subjoined description will enable any one skilled in the art to make and practice this invention.

A thin plate, *a*, of wood, metal, or other suitable material of proper strength and shape, is first prepared. This piece *a*, at such portions of it as may be required for holding bristles, may be punched with a series of holes, in each of which a mass of bristles, *b*, are inserted, so as to project above as well as below the piece *a*. On the said piece *a*, which extends from the body of the brush-back into and nearly to the extremity of the handle, and the portions of the bristles projecting above it is cast, molded, or pressed a cement or composition, *c*, so as not only to form a back or finish to the brush, but to adhere to such projecting parts and hold the bristles firmly in place.

The handle of the brush, which is a continuation of the back or body, is composed of the composition or cement, an extension, *a'*, of the piece or plate *a* extending into and nearly through said handle, which is embedded in the cement or composition, so as to either wholly or partially be covered by it, in which case the extension-piece will serve to strengthen the handle and aid in preventing the composition from being broken.

For the purpose of so making a brush, it is preferred to make use of a mold, as shown in Fig. 4, in which A and B are its two main parts. The portion A is a bed-plate, and is perforated with a series of holes to receive and support the bristles, which go through the holes in the manner as shown at *b b b* in Fig. 4, and the axis of each of these holes is to be in prolongation of that of some one of the holes of the plate *a*, which portion or plate, *a*, previous to the insertion of the bristles in the bed-plate A, is to be laid on the latter, and is also to receive the bristles which are to be run through and project somewhat above it.

The part B is the die or mold plate, which is to be formed with a cavity or matrix, *d*, to encompass the edges and top surface of the plate *a*, and the parts of the bristles which extend above the said plate *a*, the said cavity *d* being so formed as to be capable of pressing and molding upon the top surface and against the edges of the plate *a* a thin stratum of the composition when in a soft, plastic, or molding state or condition. This composition may be what is termed "hard rubber" in a condition proper for being molded, or it may be composed of shellac and comminuted earthy, mineral, or vegetable matters; or it may be otherwise made; or it may be any suitable material capable of being molded in a die or cast in a mold, and which subsequently, by exposure to atmospheric temperature, will become indurated. On applying a sufficient quantity of the composition to the plate *a*, when on the bed-plate A and duly supplied with bristles, and subsequently forcing the die-plate B down upon such composition, so as to cause it to be pressed upon the plate *a* and the bristles, and take the requisite form about the same for making a backing which shall cover the plate *a* more or less, as circumstances may require, the bristles are not only fixed in place, but a finish of the brush is effected.

The die or matrix may be made so as to produce an ornamental impression, and the handle part *a'* of the plate *a* may be formed in longitudinal section, as shown in Fig. 5, in order that when the composition is forced upon it with powerful pressure such composition may be caused to pass between the entire lower surface of the part *a'* and the bed-plate, as well as over the upper surface and about the edges of the said part *a'*, in which case the part *a'* will be entirely incased in the composition, and will serve to aid in preventing breakage of it.

The part *a'* may be in one piece with the part *a*, or the two may be made of separate pieces duly applied together, the part *a'* being of any proper form for conveniently molding the composition upon it.

The composition generally employed in the manufacture herein described is what is used in making molded photograph or miniature cases, it being composed in part of shellac; but the invention is not confined to such, as various other compositions or substances that are well known will answer the purpose.

When the brush is made as herein stated the molds are opened and the brush is easily removed, the bristles readily drawing out of the holes in the bed-plate.

No claim is made to a brush composed simply of bristles and a back made entirely of cement or a molded composition; nor is any claim made to the employment of a plate to hold the bristles while being inserted in the composition or while it may be in the act of being applied to them, such plate being subsequently drawn off from the bristles, so as to leave them adhering to the cement or composition back. The back herein described and claimed as the invention of the said ALANSON C. ESTABROOK is composed of a base-piece and a handle-extension piece or strengthener, and an outer back and handle made of suitable composition or cement molded onto such base and handle-extension or strengthening-piece—the exterior for ornament, the interior for strength.

What is claimed as the invention of ALANSON C. ESTABROOK, and desired to be secured by Letters Patent, is—

1. A back composed of an interior strip or plate of metal or other suitable material to give it requisite strength, and embedded in a composition or cement that forms in whole or in part the exterior of the back, substantially as described.

2. In a back composed of an interior strengthening-piece and a composition or cement exterior, the giving of shape, form, and ornamentation to it at the same time and by the same means that presses the plastic material around the strengthener, substantially as described.

FLORENCE MANUFACTURING COMPANY,
By ISAAC S. PARSONS,
*President.*

Witnesses:
D. W. BOND,
GEO. A. BURR.